United States Patent
Muller et al.

(10) Patent No.: US 12,371,972 B2
(45) Date of Patent: Jul. 29, 2025

(54) GEOTHERMAL WELL STIMULATION AND SILCA BASED DEPOSIT REMOVAL

(71) Applicant: SOLENIS TECHNOLOGIES, L.P., Wilmington, DE (US)

(72) Inventors: Logan Muller, Wilmington, DE (US); Paul Hewson, Wilmington, DE (US); Maria Nydia Lynch, Avondale, PA (US); Michael Bluemle, Wilmington, DE (US); Peter Slijp, Wilmington, DE (US); William S. Carey, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 0 days.

(21) Appl. No.: 18/513,816

(22) Filed: Nov. 20, 2023

(65) Prior Publication Data

US 2024/0263543 A1 Aug. 8, 2024

Related U.S. Application Data

(62) Division of application No. 16/747,604, filed on Jan. 21, 2020, now Pat. No. 11,821,287.

(51) Int. Cl.
*E21B 37/06* (2006.01)
(52) U.S. Cl.
CPC .................. *E21B 37/06* (2013.01)
(58) Field of Classification Search
CPC .................. C09K 8/52; E21B 37/06
See application file for complete search history.

(56) References Cited

U.S. PATENT DOCUMENTS

| | | | |
|---|---|---|---|
| 4,500,434 | A | 2/1985 | Jost et al. |
| 4,692,252 | A | 9/1987 | Atwood et al. |
| 4,713,119 | A | 12/1987 | Earhart et al. |
| 4,744,908 | A | 5/1988 | Peterscheck et al. |

(Continued)

FOREIGN PATENT DOCUMENTS

| | | |
|---|---|---|
| JP | 71014329 B | 7/1967 |
| JP | 2009206733 A | 9/2009 |

(Continued)

OTHER PUBLICATIONS

Portier et al., "Review on chemical stimulation techniques in oil Industry and applications to geothermal systems", ResearchGate, Jan. 2007.

(Continued)

*Primary Examiner* — Zakiya W Bates
(74) *Attorney, Agent, or Firm* — Lorenz & Kopf, LLP

(57) ABSTRACT

A method of removing built up scale in a conduit of a geothermal plant, in which conduit a fluid including mineralized water is flowing, is provided. The method includes analyzing the mineralized water and scale. A chelator, acid composition, and/or caustic composition for dissolving the scale is predetermined based on the analysis of the mineralized water and scale. The fluid in the conduit is alternately treated with the acid composition and the caustic composition. The caustic composition includes the predetermined chelator. Treating is carried out without stopping the fluid flow in the conduit. The acid composition and the caustic composition are injected directly into the fluid in the conduit.

9 Claims, 1 Drawing Sheet

(56) References Cited

U.S. PATENT DOCUMENTS

| | | |
|---|---|---|
| 5,474,097 A | 12/1995 | Lowe et al. |
| 5,665,242 A | 9/1997 | Gallup |
| 5,858,245 A | 1/1999 | Gallup |
| 6,277,801 B1 | 8/2001 | Dahanayake et al. |
| 9,745,213 B2 | 8/2017 | Kubota et al. |
| 9,840,429 B2 | 12/2017 | Takahashi et al. |
| 2007/0029252 A1 | 2/2007 | Dunson, Jr. et al. |
| 2011/0259592 A1* | 10/2011 | Reyes ............ C09K 8/04 166/305.1 |
| 2012/0217012 A1 | 8/2012 | Darby |
| 2014/0083949 A1 | 3/2014 | Takahashi et al. |
| 2015/0210567 A1 | 7/2015 | Kubota et al. |
| 2016/0009980 A1* | 1/2016 | Gupta ............ E21B 37/06 507/202 |
| 2016/0243597 A1 | 8/2016 | Shawver |
| 2017/0226404 A1 | 8/2017 | Gupta |
| 2018/0155613 A1 | 6/2018 | Conway |

FOREIGN PATENT DOCUMENTS

| | | |
|---|---|---|
| JP | 2013021245 A | 1/2013 |
| JP | 2013212457 A | 10/2013 |
| JP | 2013230433 A | 11/2013 |
| WO | 2003092919 A1 | 11/2003 |
| WO | 2012144277 A1 | 10/2012 |

OTHER PUBLICATIONS

Https://www.paas.com.au/injection-valves-quills-vs-lances/# (website—undated, embedded video (2020)); Year: 2020.

* cited by examiner

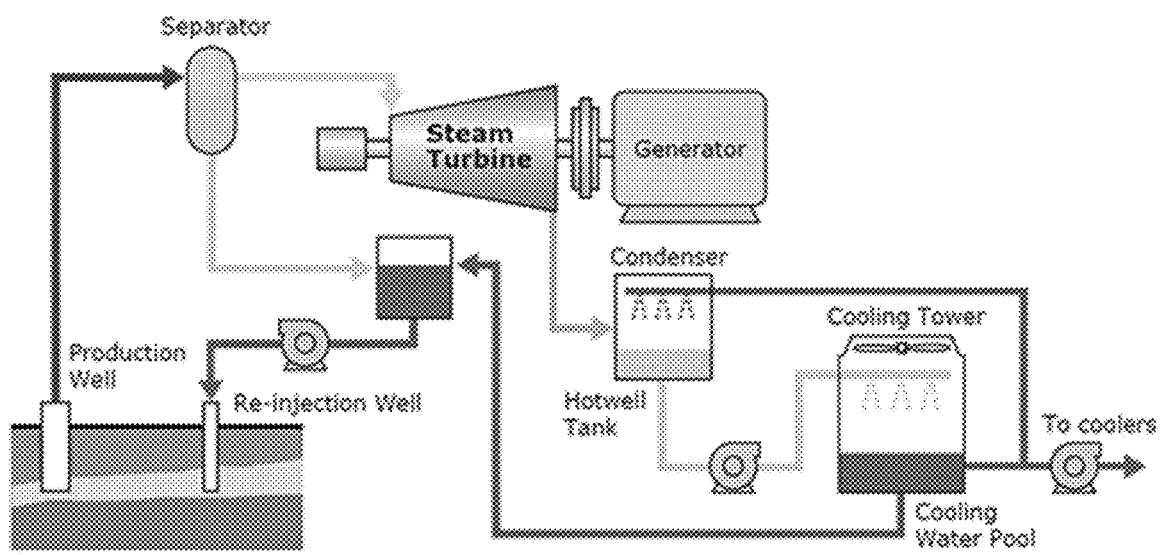

GEOTHERMAL WELL STIMULATION AND SILCA BASED DEPOSIT REMOVAL

This application is a divisional of U.S. application Ser. No. 16/747,604, filed Jan. 21, 2020.

INTRODUCTION

In the operation of a geothermal plant constituents in the steam undergo cycling and/or temperature changes which result in the supersaturation of various species and deposit formation. For example, the production well and re-injection lines are known to be areas in the process in which precipitate formation is observed. Deposits in these lines can extend from centimeters to meters from the well casing. The deposits can lead to decreased plant efficiency. As an example, silica-based mineral accumulations are typical of the deposits found in the re-injection lines. The accumulation reduces flow rates in the re-injection, ultimately necessitating throttling back the flow from the production well and resulting in decreased energy production from the plant. Maintaining the system free of deposits to attain maximum efficiency is a major cost to geothermal plant operators.

Another challenge is maximizing well reservoir productivity over time. Various techniques both mechanical and chemical have been described to stimulate or maintain the steam output; these include hydraulic fracturing (or fracking), matrix acidization, and chelant treatment.

Conventional solutions for maintaining the re-injection lines clean and/or stimulating the well reservoir include mechanical means including the use of drilling rigs, hammer tools and machining bits that are lowered into the well. Others include pumping HF or mud acid (HCl and HF) down the well. This requires the well to be taken off line and is a very dangerous process because of the severity of HF. And fracking involves using explosives or high-pressure water. These can stimulate the ability of the formation to receive fluids but require the well to be taken out of service.

Earhart et al. U.S. Pat. No. 4,713,119 described a process for removing specifically alkali metal alumina silicate scale deposits from the surface of chemical process equipment by an alternating wash of acid and base. But the Earhart process provides for direct contact of the scale with acid and base wash and drainage from the scale between washes. And it still requires the process equipment to be shut down while the treatment is going on. There is a continuing need for processes that maintain equipment like a geothermal plant free of scale without losing valuable production time and output.

SUMMARY

A method of inhibiting scale build-up or removing built up scale in a conduit in which a fluid comprising mineralized water is flowing, comprises alternately treating the fluid in the conduit with an acid composition and a caustic composition, wherein treating is carried out without stopping the fluid flow in the conduit. Generally, the method involves injecting the acid composition and the caustic composition into the conduit upstream of the location where it is desired to remove the scale or to inhibit the deposition of scale. Typically, the built-up scale comprises a predominantly amorphous silica based scale, an alkali metal aluminosilicate-based scale, or an alkaline earth metal aluminosilicate-based scale, and the acid composition and the caustic composition do not come into direct contact with the scale but are diluted by the fluid flowing in the conduit. In various embodiments, the fluid is first treated with the acid composition and in others, the fluid is first treated with the caustic composition. The acid and caustic compositions can be continuously fed or can be added in batches during the respective treating steps. The caustic composition contains an alkali and a chelator and optionally further contains a surfactant.

A method of operating a geothermal plant comprises alternately injecting the acid composition and the caustic composition into a location where scale build-up is observed, such as into the production well line of the plant or into the re-injection line of the plant, wherein the injecting steps are carried out without halting operation of the geothermal plant.

The built-up scale comprises a predominantly amorphous silica based scale, an alkali metal aluminosilicate or an alkaline earth metal aluminosilicate-based scale. The acid composition and the caustic composition do not come into direct contact with the scale but are diluted by the fluid flowing in the conduit.

A non-limiting example of a geothermal plant for use in the process comprises a production well, a production well line leading from the well to a separator, a steam turbine running off steam from the separator, a re-injection well, and a return line for water from the separator to the re-injection well, and further comprising one or more injectors disposed in the return line, in the production well line, or in both, wherein the one or more injectors are configured to deliver an acid composition and a caustic composition into the return line, into the production well line, or into both from a reservoir or from reservoirs coupled to the one or more injectors.

A major differentiator of this technology is that the treatment process can be practiced on-line; i.e., the well to be treated does not have to be taken out of service. Additionally, the treatments can be alternatively added to a continuous flow of the re-injected process water; i.e., the wash solutions are not required to stand in contact with the deposit for the treatment to be effective.

DESCRIPTION OF THE DRAWING

FIG. 1 shows a general schematic of one kind geothermal plant.

DESCRIPTION

Acid Compositions

An acid composition as used herein is an aqueous solution having a sufficiently low pH that injecting the acid composition into a conduit having flowing mineralized water lowers the pH of the flowing water to a pH below 7, creating a suitable condition for partially dissolving an aluminosilicate-based scale formed on the inner walls of the conduit. Lowering the pH of the flowing water in the conduit is affected also by the amount of acid composition provided in the conduit during a treatment step, and by the rate at which it is added, compared to the rate at which the flowing water is flowing.

So the acid treatment provides an environment with a low pH in the conduit, such as below pH 7. In various embodiments, the pH is adjusted by the acid treatment to be less than 6, less than 5, less than 4, less than 3, less than 2, or less than 1. Alternatively, the effect of the acid treatment can be observed in that it lowers the pH of the flowing water in the conduit by at least 1 unit, by at least 2 units, by at least 3 units, by at least 4 units, by at least 5 units, or by at least 6 units.

The acids suitable for use in the treatment include, without limitation, sulfuric acid, hydrochloric acid, nitric acid, acetic acid, formic acid, and sulfamic acid. In various embodiments, sulfuric acid and hydrochloric acid are used. Mixtures of acids can also be used. In an embodiment, the more hazardous hydrofluoric acid utilized in prior art applications is not used. Suitable concentrations of acid range from about 0.1 M to about 6 M.

Caustic Compositions

A Caustic composition suitable for use in caustic treatment of a pipe or conduit contains an alkali and preferably also contains a chelator. A surfactant is an optional component of the caustic composition. The caustic composition can be formulated as a single drum product or the components can be co-fed simultaneously to the system.

A caustic composition as used herein is an aqueous solution having a sufficiently high pH that injecting the caustic composition into a conduit having flowing water raises the pH of the flowing water to a pH above 7, creating a suitable condition for partially dissolving an aluminosilicate-based scale formed on the inner walls of the conduit. The extent to which the pH of the flowing water in the conduit is raised by the caustic treatment is affected also by the amount of caustic composition provided in the conduit during a treatment step, and by the rate at which it is added, compared to the rate at which the mineralized water is flowing.

The caustic treatment provides an environment with a high pH in the conduit, such as above 7. In various embodiments, the pH is adjusted by the caustic treatment to more than 8, more than 9, more than 10, more than 11, more than 12, or more than 13. Alternatively, the effect of the caustic treatment can be observed in that it raises the pH of the flowing water in the conduit by at least 1 unit, by at least 2 units, by at least 3 units, by at least 4 units, by at least 5 units, or by at least 6 units.

Non-limiting examples of the alkali include sodium hydroxide, potassium hydroxide, and sodium carbonate. A strong base such as the alkali metal hydroxide is preferred. In non-limiting fashion, the alkali is provided as a solution with a concentration of about 0.1 M to about 6 M.

Chelator

The chelator functions by solubilizing predominantly calcium and magnesium ions, preventing their precipitation, which would interfere with the caustic treatment of the aluminosilicate scale in the conduit. The chelator component of the caustic composition contains functional groups that can form stable complexes with divalent ions like Ca' and Mg' and keep them out of solution. A wide range of functional groups can chelate calcium and magnesium in this way. Commonly used chelators include those having a plurality of carboxyl groups and those having a plurality of phosphonic acid groups. At the basic pH of the caustic composition, the carboxyls and phosphonic acid groups are present in salt form (carboxylate and phosphonate, respectively), the counterion corresponding to the alkali metal present in the alkali. That counterion is usually Na+ or K+.

Non-limiting examples of chelators include the following free acids as well as their sodium and potassium salts: 1) organic acids such as gluconic acid and citric acid; 2) amino methylenecarboxylic acid derivatives such as ethylenediaminetetracetic acid (EDTA), diethylenetriaminepentaacetic acid (DTPA), and N-(2-hydroxyethyl)ethylenediaminetriacetic acid (HEDTA); other polycarboxylates such as Glutamic acid, N,N-diacetic acid (GLDA) and nitrilotriacetic acid (NTA); amino methylenephosphonic acid derivatives such as aminotris(methylenephosphonic acid) (ATMP), diethylenetriamine penta(methylene phosphonic acid) (DTPMPA), and bis(hexamethylenetriamine) penta(methylenephosphonic acid) (BHTPMP). Gluconic acid is preferred in some embodiments.

In various embodiments, in addition to the acid and caustic treatments described herein, the scale can be conditioned before those treatments by dosing with chelator for a period of time sufficient to render the scale amenable to removal by the subsequent acid and caustic treatments.

Surfactants

Preferably the surfactant component is a low-foaming surfactant that maintains performance in an alkaline environment. The surfactant component of the caustic cleaner, when utilized, can be selected from non-ionic surfactants, amphoteric surfactants, and anionic surfactants, as well as their mixtures and their blends with non-ionic surfactants. Alkyl diphenyloxide disulfonates are one example of a suitable anionic surfactant, while amphoteric surfactants are exemplified by alkylether hydroxypropyl sultaines. The latter are described more fully in Nadolsky, U.S. Pat. No. 4,891,159, the disclosure of which is hereby incorporated by reference. Exemplary non-ionic surfactants in such blends include linear or branched alcohol alkoxylates.

Weight ranges for the alkali, chelator, and optional surfactant blend of the caustic composition are given in the table.

|  | wt % | Most Preferred, wt. % |
|---|---|---|
| Alkali | 1.0-40.0 | 2.0-30.0 |
| Chelant | 0.5-30.0 | 1.0-20.0 |
| Surfactant | 0.0-20.0 | 0.5-10.0 |

Other adjunct chemistries can be added to the caustic composition such as scale and/or corrosion inhibitor compounds known to those skilled in the art.

Aluminosilicate Scale

Analysis of scale from a typical geothermal plant reveals the scale contains major amounts of silica (as SiO2) and alumina (as Al2O3), with silica higher than alumina. While the invention is not limited by theory or mode of action, it is observed that the treatment with the acid composition (the "acid wash") tends to dissolve out the alumina component of the scale, which raises the amount of aluminum detected in the fluid running through the conduit. And the "caustic wash" tends to dissolve out the silica component of the scale, causing a higher level of silicon to be observed in the fluid during a caustic treatment step. In this way, alternating acid and caustic treatments tends to dissolve and eliminate the scale formed in various parts of the geothermal plant, such as the production lines and the reinjection lines. This phenomenon is further illustrated in the Examples.

Geothermal Plants.

A general schematic of one kind geothermal plant is shown in FIG. 1. There a production well provides mineralized water—in the form of steam or a combination of heated water and steam—that is led through a production line to a separator. In the separator the pressure is reduced, causing the super-heated water from the underground pressurized foundation to become steam. The steam is led off to turn a steam turbine, while water from the separator and from downstream cooing tanks and condensers is recovered and led through the reinjection lines to the reinjection well. The water in the reinjection lines contains minerals derived from the underground formation and is responsible for the build-up of scale on the walls of the conduits in the plant. It is observed that scale builds up the most in the production line and in the reinjection line.

Another geothermal plant is called a binary geothermal plant. Here, hot water is extracted with a production well and is delivered via a production well line to a heat exchanger, where the heat of the water is used to vaporize a fluid that turns a turbine to generate electricity. The vapor returns through a condenser to the heat exchanger, and cooled water is injected back into the formation by a reinjection well that includes a reinjection well line. In various embodiments the geothermal plants have production well lines and reinjection well lines that tend to build up the scales described herein. Those scales can be removed or mitigated using the methods herein.

In one non-limiting embodiment, a geothermal plant is thus provided having a production well, a production well line leading form the well to a separator, a steam turbine running off steam from the separator, a re-injection well, and a return line for water from the separator to the re-injection well. For carrying out the cleaning process, the plant has one or more injectors disposed in the return line, in the production well line, or in both. These injectors are configured to deliver an acid composition and a caustic composition into the return line, into the production well line, or into both from a reservoir or from reservoirs coupled to the one or more injectors. The one or more injectors are configured to deliver alternately the acid composition and the caustic composition into the conduits of the geothermal plant.

The caustic composition and the acid composition are injected into conduits of the geothermal plant upstream of scale deposits, so that the deposits are exposed alternately to acid and to caustic. The two treatments together act to dissolve both the silica and alumina contents of the scale.

Laboratory dissolution tests can be performed to determine the required mix of the chemicals and the most effective timing of oscillating the above acid and caustic washes and rinses for a specific geothermal plant. In a non-limiting embodiment, the chemicals (i.e. the respective acid and caustic compositions) are injected through a lance (large quill) into the main flow of the geothermal plant re-injection well, usually through the top of the well head above the crown head valve. Flows of the calculated chemicals are injected in a series of patterns and intervals as determined by the laboratory analyses and experience. Treatment variables include the pH to which the flowing water in the conduit is exposed during a wash cycle, the timing of any rinse cycle between acid and caustic treatments, the length of the individual treatment or wash cycle, and the total number of cycles carried out, all of which can be optimized to remove scale (or prevent its formation) most efficiently. Advantageously, the treatments are carried out under full working conditions, that is to say under working pressure and temperature. This means it is not necessary to halt production of the well or to interrupt the process in any way to control scale build-up.

To sum up, caustic has been used to try and dissolve geothermal silica-based deposits before but with varying success. This method uses chelators and surfactants to enhance that part of the process. Chelators and surfactants are used to reduce the negative impacts cations in the deposits have on dissolution rates and also the re-deposition of the dissolved scales. The process also uses an acid step to attack and dissolve deposit components that are not caustic soluble to increase the porosity and surface area of the caustic soluble silica-based deposits. Finally, the cleaning process is done under full working conditions; i.e., under working pressure and temperature, without any halt in production or tear down of the plant.

EXAMPLES

Laboratory Examination

Deposit sample from a geothermal plant in New Zealand was isolated and sieved through a 10 mesh sieve. The fraction passing through the sieve was utilized in the studies. Elemental analysis of the deposit samples indicated that they comprised 66.6-68.3 wt % silicon (as $SiO_2$) and 10.8-11.2 wt % aluminum (as $Al_2O_3$). Loss on ignition (1000° C.) was 6.8-11.3 wt %. Synthetic brine recipe used in the studies was as follows.

| | |
|---|---|
| Alkalinity, Total (as $CaCO_3$) | 40.9 ppm |
| Chloride (as Cl) | 2016.0 ppm |
| Sulfate (as $SO_4$) | 45.3 ppm |
| Calcium, Total (as $CaCO_3$) | 43.4 ppm |
| Silicon, Soluble (as $SiO_2$) | 464.7 ppm |
| Sodium, Soluble (as Na) | 1285.0 ppm |
| Phosphorous, Total (as $PO_4$) | 3.1 ppm |
| pH | 7.1 |

Comparative Example I

Alkaline Caustic Cleaner Treatment Only

The alkaline caustic cleaner in this testing had the following composition.

| | |
|---|---|
| 50 wt % NaOH | 50% |
| 38 wt % EDTA.Na4 | 24% |
| Dowfax C6L | 1% |
| Water | 25% |

1 g of #10 mesh sieved scale was charged to a 100 ml solution of alkaline caustic cleaner diluted to 0.25 wt % NaOH in synthetic brine solution. The solution was held for 6 hours at 90° C. during which time aliquots were collected for analysis. After which the solution was filtered and the isolated precipitate was then charged to 100 ml DI water and held at 90° C. for 5 minutes. The solution was then filtered and the isolated sample was dried at 105° C. for weight loss.

A blank was conducted in the same fashion utilizing synthetic brine solution absent the addition of the alkaline caustic cleaner.

The silicon content of the isolated sample solutions was determined by Hach silicomolybdate Method 8185. The aluminum content was determined by utilizing Hach TNT 848 vials, Method 10215 TNT Plus.

For the alkaline caustic cleaner experiment the silicon content was analyzed and found to be 230 ppm (as $SiO_2$) after 1-hour, and gradually increased to 302 ppm after 6-hours. The blank solution silicon content was analyzed and found to be ~50 ppm for the duration of the 6-hour hold period.

For the alkaline caustic cleaner experiment the aluminum content was analyzed and found to be 0.4 ppm (as Al) after 1-hour, and increased to 1.1 ppm after 6-hours. The blank solution aluminum content was analyzed and found to be essentially zero for the duration of the 6-hour hold period.

At the end of the experiment the weight loss of the isolated scale sample for the alkaline caustic cleaner experiment was 1.9 wt % compared to 1.7 wt % for the blank.

Example I

Alternating Acid/Alkaline Caustic Cleaner Treatments

The alkaline caustic cleaner in this testing was comprised the following composition.

| | |
|---|---|
| 50 wt % NaOH | 50.00% |
| 38 wt % EDTA.Na4 | 26.3% |
| Water | 25.00% |

The test was conducted as in Comparative Example 1 except the scale was treated with a 1 wt % solution of either sulfuric acid or hydrochloric acid diluted in synthetic brine prior to treatment with the alkaline caustic cleaner diluted to 0.25 wt % NaOH in synthetic brine solution. The sequence for the treatment was as follows:
1) Treat with 100 ml acid solution for 1-hour @ 90° C.
2) Filter the solution and isolate the undissolved scale fragments.
3) Treat the precipitate with 100 ml DI water for 5-minutes @ 90° C.
4) Filter the solution and isolate the undissolved scale fragments.
5) Treat the precipitate with alkaline caustic cleaner for 1-hour @ 90° C.
6) Filter the solution and isolate the undissolved scale fragments.
7) Treat the precipitate with 100 ml DI water for 5-minutes @ 90° C.
8) Filter the solution and isolate the undissolved scale fragments.
9) Repeat steps 1-8 two additional times reusing the same treatment solutions except the DI water rinse was changed out after every treatment.

A blank was also conducted in the same fashion as Comparative Example I using synthetic brine solution absent the addition of acid and alkaline caustic cleaner. The isolate solution samples were analyzed for silicon content as described in Comparative Example I, the results of which are summarized in Table 1.

TABLE 1

| | Silicon as ppm $SiO_2$ | | |
|---|---|---|---|
| Solutions | Blank | $H_2SO_4$ | HCl |
| Acid Cycle 1 | 375 | 147 | 145 |
| Caustic Cleaner Cycle 1 | 363 | 699 | 717 |
| Acid Cycle 2 | 325 | 137 | 146 |
| Caustic Cleaner Cycle 2 | 332 | 757 | 797 |
| Acid Cycle 3 | 312 | 142 | 140 |
| Caustic Cleaner Cycle 3 | 176 | 768 | 782 |

Based on this study it can be observed in Table 1 that the silicon content of alkaline caustic cleaner solution was ~700 ppm after $1^{st}$ cycle and increased upwards of ~800 ppm after the $3^{rd}$ cycle. This result was essentially the same for pretreatments with either sulfuric ($H_2SO_4$) or hydrochloric (HCl) acids. It is further noted that the silicon content in the alkaline caustic cleaner solution even after the $1^{st}$ cycle was significantly increased compared to the alkaline caustic cleaner alone treatment in Comparative Example I; e.g., ~700 v ~300 ppm, respectively.

The benefit of the acid pre-treatment step was also observed in the weight loss analysis of the isolated scale sample. In this testing the measured weight loss was 2.6 wt %, 4.2 wt %, and 4.5 wt % for the blank, sulfuric acid pre-treatment, and hydrochloric acid pretreatment; respectively. This equates to a relative increase in weight loss versus the blank of 62%-73%. These dissolution values are significantly greater than the weight loss of 1.9 wt % (12% relative to the blank) observed for the alkaline caustic cleaner alone treatment in Comparative Example I.

Example II

Alternating Acid/Alkaline Caustic Cleaner Treatments

Repeat of the sulfuric acid pretreatment experiment of Example I with the following modifications.
1) Fresh sulfuric acid and alkaline caustic cleaner solutions were utilized in each cycle.
2) The treatments with the sulfuric acid solutions were shortened to 15-minutes at 90° C.
3) The treatments with the DI water treatments were shortened to 2-minutes at 90° C.
4) The treatments with the alkaline caustic cleaner solutions were shortened to 15-minutes at 90° C.

Using fresh sulfuric acid and alkaline caustic cleaner solutions in each cycle was a better model of multiple treatments of the injection well over time.

A blank was also conducted in the same fashion as Comparative Example I utilizing synthetic brine solution absent the addition of acid and alkaline caustic cleaner. The isolate solution samples were analyzed for silicon and aluminum content as described in Comparative Example I, the results of which are summarized in Table 2. In this example the aluminum concentration in the samples was measured by ICP analysis.

TABLE 2

| | Silicon as ppm $SiO_2$ | | Aluminum as ppm Al | |
|---|---|---|---|---|
| Solutions | Blank | $H_2SO_4$ | Blank | $H_2SO_4$ |
| Acid Cycle 1 | 36 | 150 | 1 | 21 |
| Caustic Cleaner Cycle 1 | 14 | 695 | 1 | 4 |
| Acid Cycle 2 | 56 | 133 | 1 | 6 |
| Caustic Cleaner Cycle 2 | 2 | 725 | 1 | 5 |
| Acid Cycle 3 | 13 | 122 | 1 | 5 |
| Caustic Cleaner Cycle 3 | 7 | 763 | 1 | 5 |

Based on this study it can be seen in Table 2 that the benefit of pretreating the deposit with acid prior to treatment with the alkaline caustic cleaner resulted as was observed in Example II. It can also be seen that the acid treatment was more effective in dissolving the aluminum containing portion of the deposit, especially after the $1^{st}$ cycle.

Given that the subsequent alkaline caustic cleaner treatments in this example yield a greater volume of silicon containing diluent (3×100 ml @ ~700 ppm each) versus Example II in which the alkaline caustic cleaner solution was recycled (100 ml total @ ~750 ppm) it was hypothesized that the weight loss of the scale would be greater. This was supported by a measured weight loss of 6.2 wt % for the treated sample versus 1.9 wt % for the blank. This equates to a relative increase in weight loss versus the blank of 226%.

Example III—Plant Scale

The following describes the general approach of the process of Online Well Cleaning.
1. Water and scale analysis. Each well has different water chemistry, temperatures and therefore unique scaling elements. Step one is to analyze the water and scale.
2. Once the chemical and temperature profiles are established, calculations are done to determine dose rates to achieve pH levels of the continuous flow of the well. The target pHs vary due to the type of scale but are typically 1.5 to 2.5 in acid conditions and 11 to 12 for alkaline conditions.
3. Scale samples are also tested in the lab to determine what chelants and dissolution chemistries are needed to dissolve the scales. Bench analyses are performed. Chelants may include but are not limited to: NTA, DPTA, EDTA, GDLA, and combinations thereof.
4. In a typical example, the starting flow was 64 tons/hr and as silicates were determined to be an issue the chelant composition GeoSol® GS8124 was dosed for 15 min at 30 L/hr to precondition the scale.
5. The acid composition GeoSol® 1001 was then added at 0.5% for 20 min to remove the targeted silicates. After addition of the acid composition it was flushed from the system with 200 tons of brine before the next step.
6. The chelant composition GeoSol® GS8124 was restarted and dosed for 45 minutes at 15 L/hr. This is to shift the aluminum laden silica scales. After the first cycle of treatment, a back pressure drop of 7.2 bar to 5.2 bar was observed and a flow increase from 64 t/hr to 180 t/hr.
7. After 300 minutes the well was flushed with 300 tons of brine to remove the hydrophobic surface elements on the scale and the process repeated the following day.
8. Upon completion of treatment the flow had increased to 200 t/hr (from a starting flow of 64 t/hr) and back pressure dropped from 7.2 bar to 5.9 bar.

In short the process relies on:
1. Predetermination of what will dissolve the scale and is correlated with the brine chemistry and temperature (to prevent secondary precipitation reactions).
2. As this is often a two-step process using chelants, dispersants, acid, and alkali phases, optional intermediate steps may be needed to flush away hydrophobic secondary formations on the scale that hinder the reaction efficiency. In these phases, dispersants can be injected into the brine flow to assist flushing.

We claim:

1. A method of removing built up scale in a conduit of a geothermal plant, in which conduit a fluid comprising mineralized water is flowing, the method comprising:
analyzing the mineralized water and scale;
predetermining a chelator, acid composition, and/or caustic composition for dissolving the scale based on the analysis of the mineralized water and scale; and
alternately treating the fluid in the conduit with the acid composition and the caustic composition, wherein the caustic composition comprises the predetermined chelator, wherein treating is carried out without stopping the fluid flow in the conduit, and wherein the acid composition and the caustic composition are injected directly into the fluid in the conduit.

2. The method of claim 1, wherein analyzing the mineralized water and scale comprises determining that the scale comprises:
amorphous silica; and
one or more of alkali metal aluminosilicate-based scale, or an alkaline earth metal aluminosilicate-based scale.

3. The method of claim 2, wherein predetermining the chelator, acid composition, and/or caustic composition comprises selecting the chelator, acid composition, and/or caustic composition based on identification of the scale comprising amorphous silica.

4. The method of claim 1, wherein predetermining the chelator, acid composition, and/or caustic composition comprises:
determining dose rates of the acid composition to achieve pH level of the continuous fluid flow of from 1.5 to 2.5 during treating the fluid with the acid composition; and
determining dose rates of the caustic composition to achieve a pH level of the continuous fluid flow of from 11 to 12 during treating of the fluid with the caustic composition.

5. The method of claim 4, wherein analyzing the mineralized water and scale further comprises determining temperature of the water exiting the production well, and wherein determining the dose rates of the acid composition and the caustic composition is done based on the determined temperature of the water exiting the production well.

6. The method of claim 1, wherein analyzing the scale comprises dissolving the scale with a variety of chelators.

7. The method of claim 6, wherein dissolving the scale comprises dissolving the scale with a chelator chosen from nitrilotriacetic acid, diethylenetriamine pentaacetate, ethylenediamine tetraacetic acid, tetrasodium glutamate diacetate, and combinations thereof.

8. The method of claim 1, further comprising flushing hydrophobic secondary formations on scale in the fluid in an intermediate step between alternately treating the fluid in the conduit with the acid composition and the caustic composition.

9. The method of claim 8, wherein flushing the hydrophobic secondary formations on scale in the fluid comprises injecting a dispersant into the fluid flow.

* * * * *